(12) United States Patent
Smirnov et al.

(10) Patent No.: US 7,599,569 B2
(45) Date of Patent: Oct. 6, 2009

(54) METHOD AND APPARATUS FOR BILATERAL HIGH PASS FILTER

(75) Inventors: Maxim Smirnov, Brampton (CA); Milivoje Aleksic, Richmond Hill (CA); Sergiu Goma, Stouffville (CA)

(73) Assignee: ATI Technologies, ULC, Ottawa, Ontario (CA)

( * ) Notice: Subject to any disclaimer, the term of this patent is extended or adjusted under 35 U.S.C. 154(b) by 681 days.

(21) Appl. No.: 11/332,001

(22) Filed: Jan. 13, 2006

(65) Prior Publication Data

US 2007/0165962 A1 Jul. 19, 2007

(51) Int. Cl.
G06K 9/40 (2006.01)
G06K 9/64 (2006.01)
(52) U.S. Cl. .................................. 382/260; 382/279
(58) Field of Classification Search ............... 382/162, 382/260, 261, 264, 266, 274, 275, 299, 305, 382/312, 279
See application file for complete search history.

(56) References Cited

U.S. PATENT DOCUMENTS

| | | | | |
|---|---|---|---|---|
| 4,817,182 A | * | 3/1989 | Adelson et al. | 382/248 |
| 7,038,185 B1 | * | 5/2006 | Tumblin et al. | 250/208.1 |
| 7,082,218 B2 | * | 7/2006 | Pollard et al. | 382/167 |
| 7,085,401 B2 | * | 8/2006 | Averbuch et al. | 382/103 |
| 7,146,059 B1 | * | 12/2006 | Durand et al. | 382/260 |
| 7,426,312 B2 | * | 9/2008 | Dance et al. | 382/254 |
| 7,430,334 B2 | * | 9/2008 | Keshet et al. | 382/260 |
| 7,457,477 B2 | * | 11/2008 | Petschnigg et al. | 382/274 |
| 7,477,794 B2 | * | 1/2009 | Lefebvre et al. | 382/240 |
| 2005/0025378 A1 | * | 2/2005 | Maurer | 382/260 |

* cited by examiner

Primary Examiner—Kanji Patel
(74) Attorney, Agent, or Firm—Vedder Price PC (57) ABSTRACT

A target pixel and surrounding pixels corresponding to the target pixel are obtained from a digitally represented image. A bilateral high pass filtering kernel is determined based at least in part upon the target pixel and the surrounding pixels. A high pass spatial filtering kernel is provided and multiplied with the high pass photometric filtering kernel to provide a bilateral high pass filtering kernel. The resulting bilateral high pass filtering kernel is thereafter applied to the target pixel and the surrounding pixels to provide a filtered pixel. When it is desirable to combine noise filtering capabilities with sharpening capabilities, the bilateral high pass filter of the present invention may be combined with a bilateral low pass filtering kernel to provide a combined noise reduction and edge sharpening filter. The present invention may be advantageously applied to a variety of devices, including cellular telephones that employ image sensing technology.

19 Claims, 5 Drawing Sheets

METHOD AND APPARATUS FOR BILATERAL HIGH PASS FILTER

FIELD OF THE INVENTION

The invention relates generally to filtering of digitally represented images and, in particular, to devices and methods that employ bilateral filters to process digital images.

BACKGROUND OF THE INVENTION

Devices are known, such as laptop computers, desktop computers, cell phones, cable set top boxes, printers and other devices, that employ graphics processing that may be used to perform filtering operations on digital representations of images. Software programs for performing such filtering are also well known. A typical filtering operation performed on images is noise reduction. When an image is digitally captured, an inevitable consequence of the capture process is the addition of random "noise" that degrades, no matter how slightly, the quality of the captured image.

In the broadest sense of the term "filtering," the value of the filtered image at a given location is a function of the values of the input image in a relatively small neighborhood of the same location. Typically, a low-pass filter is used that computes an average of pixel values (often a weighted average in which each weight is determined by a Gaussian function) in the neighborhood of a particular pixel being filtered. Low-pass filters are effective in filtering out additive noise because, intuitively, images typically vary slowly over space, so nearby pixels are likely to have similar color or gray values. Therefore it is appropriate to average them together. The noise values that corrupt a pixel and its nearby pixels are mutually less correlated than the pixel values, so noise is averaged away while signal is preserved. However, the assumption of slow spatial variations fails at edges (i.e., boundaries between regions of substantially different colors within the image), which are consequently blurred by low-pass filtering.

To overcome the edge blurring effect of low-pass filtering schemes, Tomasi and Manduchi originally proposed the concept of bilateral filters that preserve the noise-reduction properties of spatial low-pass filters while simultaneously reducing the edge blurring effect of such filters. The Tomasi/Manduchi bilateral filter combines two low-pass filtering operations: spatial, which averages pixels together based on their geometric distance from the pixel being filtered, and photometric, which averages pixels based upon the perceptual similarity between the currently filtered (target) pixel and the pixels in its vicinity. Thus, the spatial low-pass filter component of the bilateral filter provides the desired noise reduction, whereas the photometric low-pass filter component preserves edges by more heavily weighting nearby pixels that are similar in color to the target pixel and reducing the effect of nearby pixels that are dissimilar in color to the target pixel. Stated more succinctly, the bilateral filter exploits the concept that it makes sense to most heavily rely upon those pixels that are geometrically close and similar in color when averaging away the noise signal.

In practice, the bilateral filter has been shown to provide very good noise reduction performance while preserving the integrity of edges found in the image. However, it would be desirable to not only preserve edges, but to actually enhance (sharpen) edges found in digitally represented images. For example, the use of cameras in cellular telephones has increasingly gained consumer acceptance. However, such camera systems often suffer from relatively low quality optics and light sensing components, which subsequently tend to increase the noise level in captured images. Furthermore, edge blurring in images captured by such systems tends to be worsened by the relatively low quality optics and by shaking of the camera during long exposure times. Accordingly, it would be advantageous to provide edge sharpening capabilities without amplification of noise or, alternatively, edge sharpening capabilities in addition to noise filtering operations in systems operating upon captured digital images.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, an embodiment of the present invention provides a method for filtering at least one pixel of an image using a bilateral high pass filter and, optionally, a bilateral low pass filter. In particular, a target pixel and surrounding pixels corresponding to the target pixel are obtained from a digitally represented image. A bilateral high pass filtering kernel is determined based at least in part upon the target pixel and the surrounding pixels. According to one aspect of the present invention, distances, such as Euclidean distances, between the target pixel and at least some of the surrounding pixels are determined and used to calculate the bilateral high pass filtering kernel. Furthermore, in accordance with a presently preferred embodiment, a thresholding operation is performed on each of the Euclidean distances. Only those Euclidean distances comparing favorably with the threshold value give rise to a non-zero coefficient value. Thereafter, the coefficients determined by the thresholding process are used to determine a high pass photometric filtering kernel. A high pass spatial filtering kernel is provided and multiplied with the high pass photometric filtering kernel to provide the bilateral high pass filtering kernel. The resulting bilateral high pass filtering kernel is thereafter applied to the target pixel and the surrounding pixels to provide a filtered pixel. When it is desirable to combine noise filtering capabilities with sharpening capabilities, the bilateral high pass filter of the present invention may be combined with a bilateral low pass filtering kernel to provide a combined noise reduction and edge sharpening filter.

In another embodiment of the present invention, a circuit for filtering at least one pixel of an image is also provided. Similarly, the present invention may be incorporated into a device capable of filtering an image, which device may be capable of capturing and/or displaying the image. For example, the present invention may be advantageously applied to a cellular telephone or other devices that employ image sensing technology.

Figure 1:
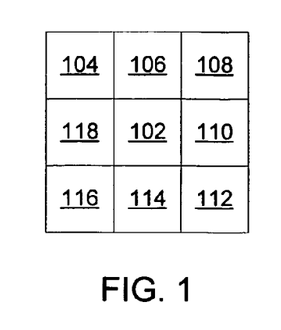
FIG. 1 is a schematic illustration of an exemplary kernel in accordance with the present invention.

Referring now to the Figures, FIG. 1 is a schematic illustration of an exemplary kernel in accordance with the present invention. As used herein, a "kernel" denotes a pre-determined arrangement or pattern of values, which values may comprise, for example, pixel values, photometric distances (as described in detail below), filtering coefficient values, etc. Thus, for example, FIG. 1 illustrates a square kernel comprising a 3×3 array. In particular, a target pixel 102 is surrounded by a plurality of surrounding pixels 104-118. Those having skill in the art will appreciate that the surrounding pixels may comprise additional pixels that are not immediately adjacent to the target pixel 102 as in the case, for example, of a 5×5 array. Regardless of its configuration, the nature of bilateral filtering requires that the same kernel pattern be used throughout the filtering process, i.e., there is a strict spatial correspondence between the pixels being filtered and subsequent values calculated based on those pixels. Furthermore, although a square kernel is illustrated in FIG. 1, it is understood that other patterns, such as rectangles, trapezoids or other shapes may be equally employed as a matter of design choice. Furthermore, the surrounding pixels employed by the present invention need not include any or all adjacent pixels as illustrated in FIG. 1.

As used herein, a "pixel" is the smallest discrete unit used to represent an image represented on a display, although it is noted that, in sub-sampling, a (displayed) pixel is actually the aggregation of several pixels of an image rendered at a higher resolution. In practice, each pixel is either a scalar value as in the case of black and white images, or an array of parameter values (e.g., an RGB triplet) as in the case of color images. It should be noted that any color space capable of supporting a distance determination between different color samples may be employed by the present invention. For example, any of the well known RGB (red, green, blue), YCrCb (luminance, chrominance red, chrominance blue), or CIELAB (international standard designed to more accurately represent color perception rather than color intensity) color space representations may be used.

Figure 2:
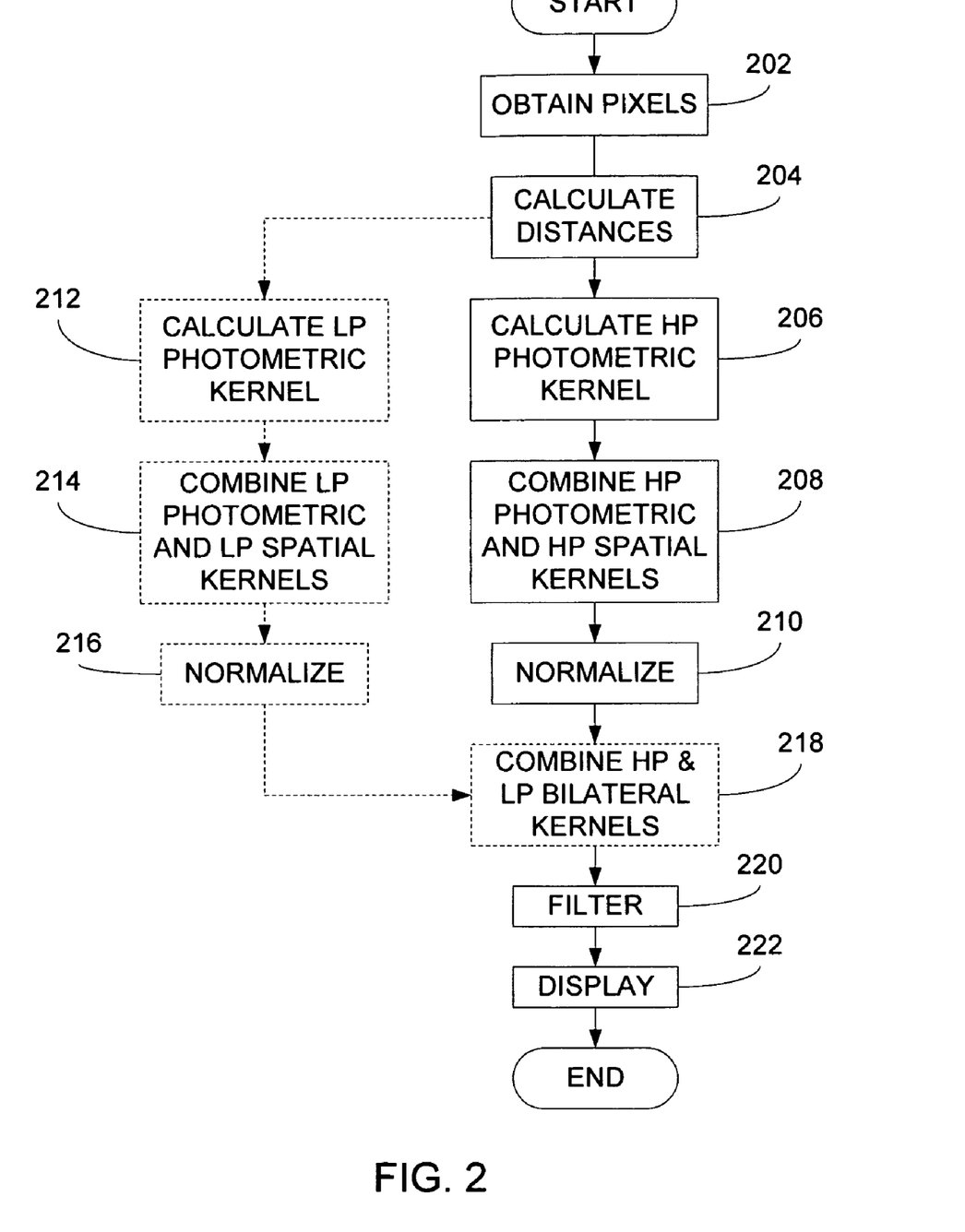
FIG. 2 is a flow chart illustrating processing in accordance with a first embodiment and an alternative embodiment of the present invention.

Referring now to FIG. 2, a flow chart is illustrated describing processing in accordance with the present invention. Generally, the processing illustrated in FIG. 2 may be implemented entirely in hardware circuitry using, for example, state machines operating under the control of appropriately programmed logic circuits. Alternatively, the process may be implemented using a general purpose or specialized processor operating under the control of executable instructions that are stored in volatile or non-volatile memory, such as RAM or ROM or any other suitable storage element. Further still, a combination of hardware and software components may be equally employed.

Regardless, at block 202 a target pixel and its surrounding pixels as defined by a predetermined kernel are obtained. The present invention is not limited by a particular source of image data. For example, the image data may be a still image obtained using one or more CMOS (complementary metal oxide semiconductor) or CCD (charge-coupled device) sensors as may be found in various portable imaging devices, such as cellular telephones. Alternatively, the image may comprise a single frame taken from video data in the case of digital camcorder. Further still, the image data may reside in a print buffer prior to printing output. In a presently preferred embodiment, each pixel is represented as a YCrCb triplet.

At block 204, chromatic distances (i.e., the differences between different colors) between the target pixel and at least some of the surrounding pixels are determined. In a presently preferred embodiment, these chromatic distances are determined as a Euclidean distance, $D^2$, between two pixels, $\vec{x}[i, j]$, $\vec{x}[i-n, j-m]$, in YCrCb space as shown in Equation 1.

$$D^2(\vec{x}[i,j], \vec{x}[i-n, j-m]) = (Y[i,j] - Y[i-n, j-m])^2 + (Cb[i,j] - Cb[i-n, j-m])^2 + (Cr[i,j] - Cr[i-n, j-m])^2 \quad \text{Eq. 1}$$

Preferably, a distance calculation is made for each position within the basic kernel. Thereafter, at block 206, a high pass photometric filtering kernel is determined based on the distances determined at block 204. In a traditional bilateral filter, a Gaussian function provides individual weights used to calculate each coefficient in the high pass photometric filtering kernel. However, as known in the art, this requires a significant amount of computational power such that it is desirable to simplify the computational process. To this end, the present invention employs a thresholding function to determine the coefficients of the high pass photometric filtering kernel, $W_P^{HP}[n, m]$, as described in Equation 2 below.

$$W_P^{HP}[n, m] = \begin{cases} 1, & \text{if } D^2[n, m] > HPThreshold^2 \\ 0, & \text{otherwise} \end{cases} \quad \text{Eq. 2}$$

As shown in Equation 2, if a particular distance value compares favorably with (i.e., is greater than) a fixed threshold value, HPThreshold, a non-zero coefficient is provided in the corresponding position of the high pass photometric filtering kernel. Otherwise, a zero coefficient is provided.

Thereafter, at block 208, the high pass photometric filtering kernel is combined with a high pass spatial filtering kernel by multiplying the two kernels together. Because the high pass spatial filtering kernel is based on the fixed spatial configuration of the kernel, the coefficients of the high pass spatial kernel are constants and may be stored for recall when needed. In practice, the resulting bilateral high pass filtering kernel is normalized in order to maintain a zero DC frequency response. Continuing with the thresholding-based embodiment described above, a suitable filter normalizing coefficient, $b_{HP}$, as determined at block 210, is described in Equation 3 below.

$$b_{HP} = \sum_n \sum_m K_{sharp} \times W_P^{HP}[n, m] \times W_S^{HP}[n, m] \quad \text{Eq. 3}$$

In Equation 3, $K_{sharp}$ is a sharpening coefficient, as know in the art, that sets the desired amount of sharpening and $W_S^{HP}[n, m]$ is the high pass spatial filtering kernel.

As noted above, the bilateral high pass filtering kernel of the present invention can operate in conjunction with a more traditional bilateral low pass filtering kernel, as illustrated in blocks 212-216. If the noise filtering effects of a low pass filter are to be employed, a low pass photometric filtering kernel is determined at block 212 based on the distances calculated at block 204. As illustrated in Equation 4 below, a similar thresholding function as that employed in the case of the high pass photometric filtering kernel may also be employed to derive a low pass photometric filtering kernel, $W_P^{LP}[n, m]$.

$$W_P^{LP}[n, m] = \begin{cases} 1, & \text{if } D^2[n, m] \leq LPThreshold^2 \\ 0, & \text{otherwise} \end{cases} \quad \text{Eq. 4}$$

In particular, as shown in Equation 4, if a given distance compares favorably with (i.e., is less than or equal to) a low pass threshold value, LPThreshold, then a non-zero coefficient value is provided in the corresponding position within the filtering kernel. Otherwise, a zero value is provided. Once again, this technique greatly simplifies the determination of the low pass photometric filtering kernel values. Thereafter, at block 214, the low pass photometric filtering kernel is combined with a low pass spatial filtering kernel, $W_S^{LP}[n, m]$, by multiplying the two together. As before, the low pass spatial filtering kernel may be treated as a set of constant values that may be recalled from storage as needed. Additionally, as in the case of the bilateral high pass filtering kernel, the bilateral low pass filtering kernel is normalized at block 216 using a normalizing low pass coefficient, $K_{LP}$, as defined in Equation 5 below.

$$K_{LP} = \frac{1}{\sum_n \sum_m W_P^{LP}[n, m] \times W_S^{LP}[n, m]} \quad \text{Eq. 5}$$

If the bilateral high pass filtering kernel is being used alone, processing continues at block 220 where the bilateral high pass filtering kernel is used to filter the target pixel. In practice, this implies performing a two-dimensional (2D) convolution between the kernel comprising the target pixel and its surrounding pixels and the bilateral high pass filtering kernel, resulting in a filtered pixel value. To implement the bilateral high pass filtering kernel alone, it is first combined with a pass-through filter, U, as shown in Eq. 6 below:

$$W^{HP}[n, m] = \{(K_{Sharp} \times W_P^{HP}[n, m] \times W_S^{HP}[n, m]) - b_{HP} \times U\} + U \quad \text{Eq. 6}$$

The pass-through filter is of the same dimensions as the kernel and is defined as:

$$U = \begin{bmatrix} 0 & \cdots & 0 & \cdots & 0 \\ \vdots & \ddots & \vdots & \iddots & \vdots \\ 0 & \cdots & 1 & \cdots & 0 \\ \vdots & \iddots & \vdots & \ddots & \vdots \\ 0 & \cdots & 0 & \cdots & 0 \end{bmatrix} \quad \text{Eq. 7}$$

If, however, both high pass and low pass bilateral filtering kernels are used, processing first continues at block 218 where the respective high pass and low pass bilateral filtering kernels are combined. In the presently preferred embodiment, this is accomplished by adding the two kernels together as illustrated below in Equation 8.

$$W[n, m] = \{(K_{Sharp} \times W_P^{HP}[n, m] \times W_S^{HP}[n, m]) - b_{HP} \times U\} + \{(K_{LP} \times W_P^{LP}[n, m] \times W_S^{LP}[n, m])\} \quad \text{Eq. 8}$$

As in the case of the bilateral high pass filtering kernel described above, the combined bilateral filtering kernel, W[n, m], established at block 218 is used to filter the target pixel through a 2D convolution of the target pixel and its surrounding pixels with the combined bilateral filtering kernel.

Regardless of whether the bilateral high pass filtering kernel is used alone or in combination with a bilateral low pass filtering kernel, the resulting filtered pixels may thereafter be displayed at block 222. As used herein, the "display" of a filtered pixel is dependent upon the particular type of device within which the present invention is employed. For example, in the case of a cellular telephone having a display such as an LCD (liquid crystal display) or similar display, the display process at block 222 would comprise outputting the filtered pixels to a display buffer as known in the art. Alternatively, if the above described processing is being performed on an image stored in a print buffer, as in the case of a printer device, the actions employed to display the filtered pixel would cause a printing element to establish markings of the appropriate colors on a printed page. The process illustrated in FIG. 2 is largely device-independent and may be equally employed in a variety of devices, e.g., computers, digital cameras and camcorders, cable set top boxes, etc.

Figure 3:
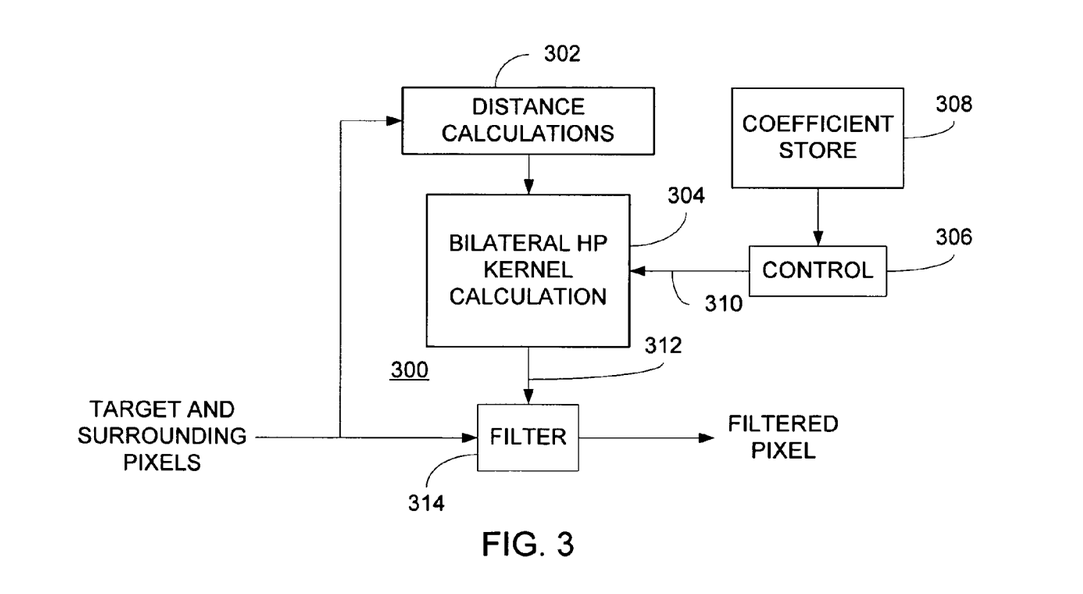
FIG. 3 is a schematic block diagram illustrating a circuit in accordance with the first embodiment of the present invention.

Referring now to FIG. 3, a schematic block diagram of a first embodiment of a circuit in accordance with the present invention is illustrated. In practice, the circuit illustrated in FIG. 3 may be implemented using a suitably programmed logic array, an integrated circuit, or even discrete logic components, as known to those have ordinary skill in the art. Alternatively, such a circuit, in its broadest sense, may be implemented using software, i.e., in which a processor (such as a microprocessor, microcontroller, digital signal processor, etc. or combinations thereof) carries out operations based on stored, executable instructions. Regardless, a distance calculation component 302 is provided that takes as input the target and surrounding pixels previously described. (As used herein, a component is a constituent part of, either physically or logically, a circuit or another component.) Once again, the distances calculated by the distance calculation component 302 preferably comprise Euclidean distances between the target pixel and at least some of the surrounding pixels. The resulting distances are thereafter provided to a bilateral high pass kernel calculation component 304 which determines a bilateral high pass filtering kernel as previously described. The bilateral high pass kernel calculation component 304 additionally takes as input high pass parameters 310 (e.g., HP Threshold and $K_{sharp}$ described above) provided by a control component 306 that may be used to control a particular implementation of the high pass filter as determined by various criteria. For example, it may be desirable to employ different levels of high pass filtering (sharpening) depending upon the level of exposure used to capture the image currently being filtered. Thus, the control block 306 may take as input (not shown) information representative of the level of exposure used to capture the current image. Based on this exposure information, the control block 306 accesses one of a plurality of separate coefficient sets stored in the parameter storage block 308.

Regardless, the output of the bilateral high pass kernel calculation component 304 is a bilateral high pass filtering kernel 312 that is provided to a filtering component 314. The filtering component 314 also takes as input the target and surrounding pixels as illustrated in FIG. 3. The filtering component 314 thereafter applies (i.e., a 2D convolution) the bilateral high pass filtering kernel 312 to the target pixel and surrounding pixels to provide the filtered pixel as output.

Figure 4:
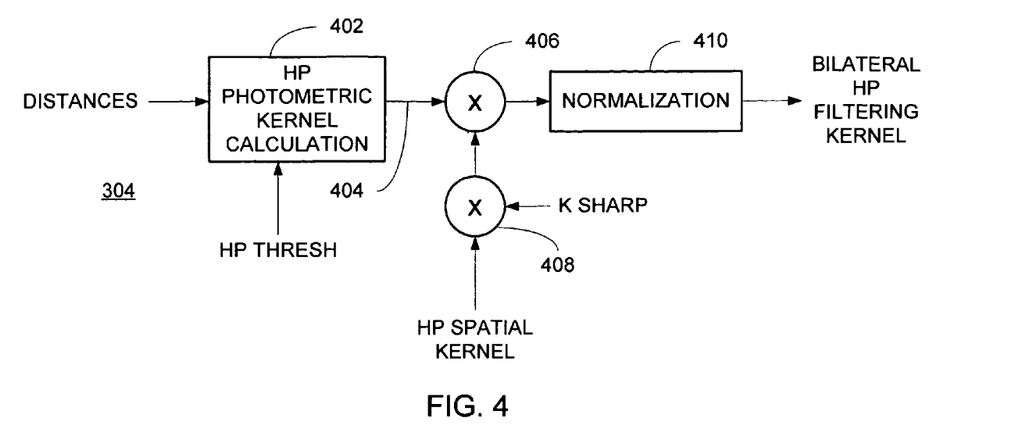
FIG. 4 is a schematic block diagram illustrating the bilateral high pass kernel calculation component of FIG. 3 in greater detail.

A more detailed illustration of the bilateral high pass kernel calculation component 304 is further provided in FIG. 4. As shown in FIG. 4, a high pass photometric kernel calculation component 402 takes as input the distances computed by the distance calculation component 302 and, in a preferred embodiment, the high pass threshold parameter and provides as output the bilateral high pass filtering kernel 404 in accordance with the processing described above. Along a parallel path, a high pass spatial filtering kernel is provided to a multiplier 408 which multiplies the high pass spatial filtering kernel by the sharpening coefficient. Note that, in practice, the sharpening coefficient can be multiplied with the bilateral high pass filtering kernel 404 as an alternative. Regardless, the high pass spatial filtering kernel is output by the multiplier 408 and thereafter provided to another multiplier 406 which is used to multiply the high pass photometric filtering kernel 404 and the high pass spatial filtering kernel. Thereafter, a normalization component 410 executes the normalization processing described above and provides as output the bilateral high pass filtering kernel which may thereafter be used to perform filtering operations.

Figure 5:
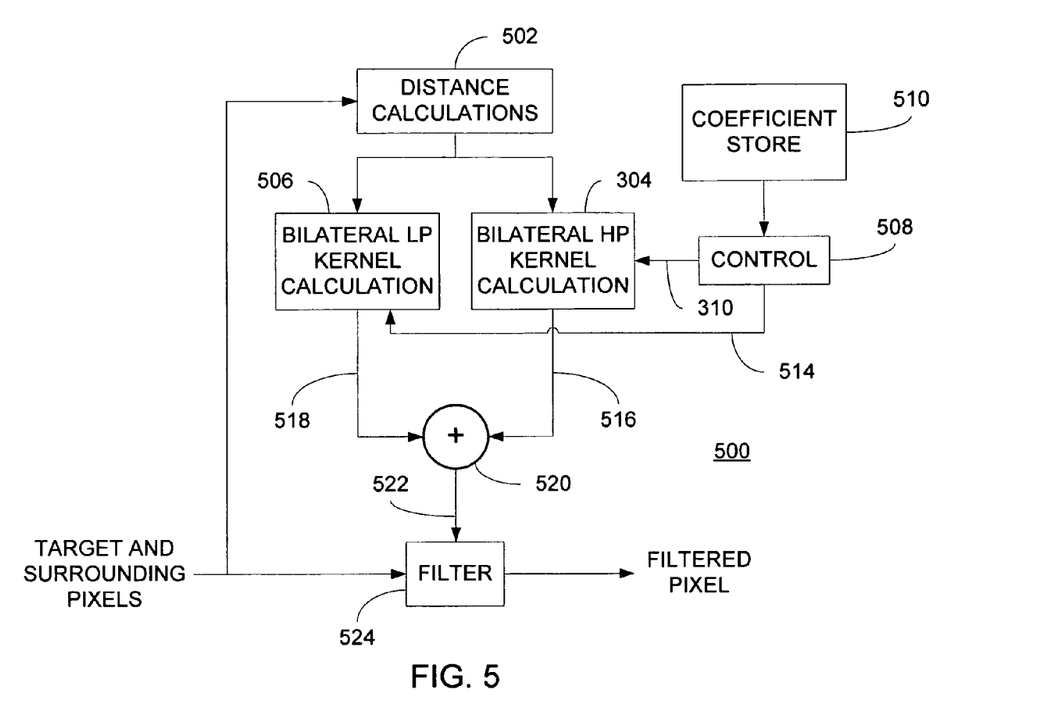
FIG. 5 is a schematic block diagram illustrating a circuit in accordance with the alternative embodiment of the present invention.

As noted above, the bilateral high pass filtering kernel in accordance with the present invention may be combined with a bilateral low pass filtering kernel as further illustrated in FIG. 5. In particular, FIG. 5 illustrates a circuit 500 comprising both a bilateral high pass filtering kernel calculation component 304 and a bilateral low pass filtering kernel calculation component 506. As in FIG. 3, the circuit illustrated in FIG. 5 may be implemented using a suitably programmed logic array, an integrated circuit, or even discrete logic components, as known to those have ordinary skill in the art. Alternatively, such a circuit, in its broadest sense, may be implemented using software, i.e., in which a processor (such as a microprocessor, microcontroller, digital signal processor, etc. or combinations thereof) carries out operations based on stored, executable instructions. Like the circuit 300 of FIG. 3, the circuit 500 employs a distance calculation component 302 used to calculate Euclidean distances between the target pixel and its surrounding pixels. The distances are thereafter provided to the bilateral high pass kernel calculation component 304 and the bilateral low pass kernel calculation component 506. Using the techniques described above relative to FIG. 2, the bilateral high pass kernel calculation component 304 and the bilateral low pass kernel calculation component 506 calculate their respective filtering kernels based on parameters 310, 514 (in the case of the low pass filter, LP Threshold) provided by a control block 508. As before, the control block 508 may be used to provide parameters sets to the respective calculation components, which parameter sets are chosen based on knowledge of the particular conditions under which the image currently being analyzed was captured.

The resulting bilateral high pass filtering kernel 516 and bilateral low pass filtering kernel 518 are combined using an adder 520 to provide a combined bilateral filtering kernel 522. As before, the combined bilateral filtering kernel 522 is provided to a filter 524 that applies the combined bilateral filtering kernel 522 to the target and surrounding pixels using a 2D convolution process to provide a filtered pixel.

Figure 6:
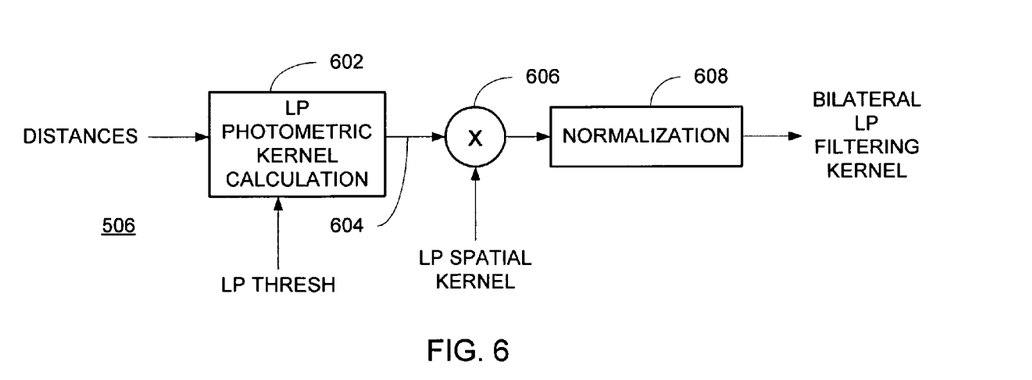
FIG. 6 is a schematic block diagram illustrating the bilateral low pass kernel calculation component of FIG. 5 in greater detail.

Further details concerning the bilateral low pass kernel filtering calculation component 506 are provided in FIG. 6. As illustrated therein, the distances provided by distance calculation component 302 are provided to a low pass photometric kernel calculation component 602 that also takes as input the low pass threshold parameter as described above. Preferably, the low pass photometric kernel calculation component 602 uses the previously described thresholding procedure to calculate a low pass photometric filtering kernel 604. Thereafter, a multiplier 606 is used to combine the low pass photometric filtering kernel 604 and a low pass spatial filtering kernel, as illustrated. The resulting combined kernel is thereafter provided to a normalization component 608 which normalizes the bilateral low pass filtering kernel, as previously described above.

Figure 7:
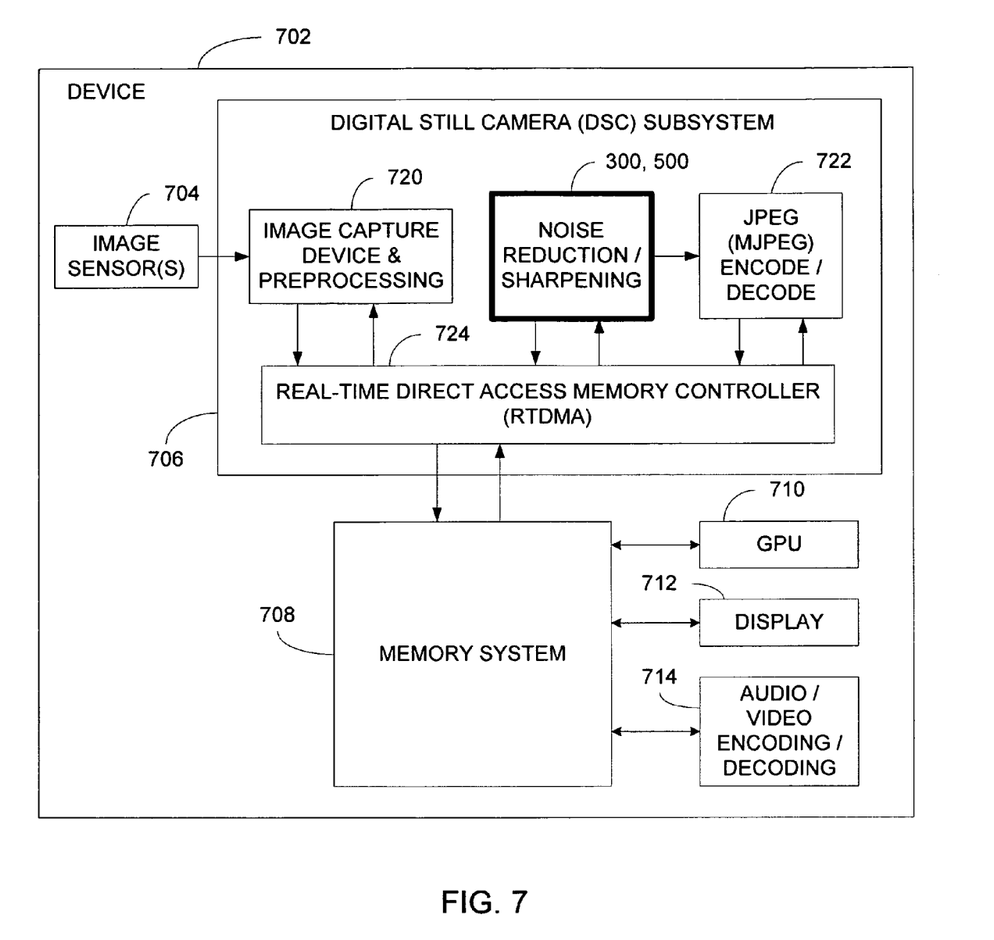
FIG. 7 is block diagram of a device incorporating an exemplary hardware configuration suitable for implementing various embodiments of the present invention.

Referring now to FIG. 7, a block diagram of a device 702 incorporating an exemplary hardware configuration suitable for implementing various embodiments of the present invention is shown. Generally, the device 702 comprises one or more image sensors 704 in communication with a digital still camera (DSC) subsystem 706. In turn, the DSC subsystem 706 communicates with a memory system 708 suitable for use in performing graphics processing operations of the type described herein. As further illustrated in FIG. 7, a graphics processing unit (GPU) 710, a display 712, and an audio/video encoding/decoding component 714 also communicate with the memory system 708. In general, the image sensors 704, such as CMOS or CCD sensors, are used to provide raw image data to the DSC subsystem 706, which, in turn, processes the raw image data and stores the resulting processed image data in the memory system 708. Thereafter, the processed image data is available for further processing by the GPU 710 or the audio/video encoding/decoding component 714. Alternatively, the processed image data may be provided to the display 712 for display to a user of the device 702.

As further illustrated in FIG. 7, the DSC subsystem 706 comprises various components including a noise reduction sharpening circuit 300, 500 in accordance with the present invention. More particularly, the raw image data provided by the image sensors 704 is provided to an image capture and preprocessing block 720. As known in the art, the image capture and preprocessing block 720 performs any preprocessing that may be needed. Such preprocessing, as known in the art, may include various correction operations to compensate for known limitations of the image sensors, corresponding optics, etc. Data output by the image capture and preprocessing block 720 is provided to the memory system 708 via a real time direct access memory controller (RTDMA) 724. Once stored in the memory system 708, the image data may be further operated upon by the noise reduction/sharpening circuit 300, 500 which likewise accesses memory system 708 via the RTDMA 724. Image data filtered by the noise reduction/sharpening circuit 300, 500 is thereafter also provided to the memory system 708. Finally, a JPEG (MJPEG) encode/decode block 722 may also access image data stored in the memory system 708 (whether filtered or not) via the RTDMA 724. Of course, the filtered image data, or any other image data, stored in the memory system 708 may be accessed by the audio/video encoding/decoding component 714 or display 712.

A wide variety of devices may incorporate, or otherwise benefit from use of, the present invention. For example, digital cameras, digital camcorders or any other image capture devices may employ processing in accordance with the present invention. Additionally, devices within a wireless communication system may incorporate or otherwise benefit from the present invention. Devices within wireless communication systems may include wireless handsets, such as cellular telephones or handheld radios, as well as network infrastructure equipment, such as base stations, switches, routers, etc. Each of these devices may perform the techniques described above or serve as a receiver or transmitter of images that have been processed in accordance with the techniques described above. For example, a particular element within the network infrastructure may receive unprocessed images from wireless devices and perform the processing described above. Alternatively, network elements, or even other wireless communication devices, may simply transmit and received images that were processed elsewhere in accordance with the present invention.

As described above, the present invention provides a technique for performing edge sharpening operations using a bilateral high pass filter. This provides designers the ability to perform edge sharpening without amplification of noise. Additionally, traditional bilateral filters may be used in conjunction with the present invention, thereby providing the noise reduction benefits of such filters in addition to the edge sharpening capability of a bilateral high pass filter.

It is therefore contemplated that the present invention cover any and all modifications, variations or equivalents that fall within the spirit and scope of the basic underlying principles disclosed above and claimed herein.

What is claimed is:

1. A method for filtering at least one pixel of an image, the method comprising:
    determining Euclidean distances between a target pixel and at least some of surrounding pixels corresponding to the target pixel;
    determining a bilateral high pass filtering kernel based at least in part upon the Euclidean distances; and
    applying the bilateral high pass filtering kernel to the target pixel and the surrounding pixels to provide a filtered pixel.

2. The method of claim 1, wherein determining the bilateral high pass filtering kernel further comprises:
    comparing each of the Euclidean distances with a threshold value;
    determining a non-zero high pass filtering kernel value for each Euclidean distance comparing favorably with the threshold value;
    providing a zero high pass filtering kernel value for each Euclidean distance comparing unfavorably with the threshold value; and
    determining a high pass photometric filtering kernel based at least in part upon the non-zero and zero high pass kernel values,
    wherein the bilateral high pass filtering kernel is based at least in part upon the high pass photometric filtering kernel.

3. The method of claim 1, wherein determining the bilateral high pass filtering kernel further comprises:
    determining a high pass spatial filtering kernel; and
    multiplying the high pass spatial filtering kernel with a high pass photometric filtering kernel to provide the bilateral high pass filtering kernel.

4. The method of claim 1, further comprising:
    determining a bilateral low pass filtering kernel based at least in part upon the target pixel and the surrounding pixels; and
    applying the bilateral low pass filtering kernel to the target pixel and the surrounding pixels to provide the filtered pixel.

5. The method of claim 4, further comprising:
    combining the bilateral high pass filtering kernel and the bilateral low pass filtering kernel to provide a combined bilateral filtering kernel; and
    convolving the combined bilateral filtering kernel with the target pixel and the surrounding pixels to provide the filtered pixel.

6. The method of claim 1, further comprising:
    displaying the filtered pixel.

7. In a device, a method for receiving an image, the method comprising:
    receiving the image that comprises at least one filtered pixel,
    wherein the at least one filtered pixel is provided by applying a bilateral high pass filtering kernel to a target pixel and surrounding pixels corresponding to the target pixel, the bilateral high pass filtering kernel being based on a high pass photometric filtering kernel in which high pass filtering kernel values are determined based on Euclidean distances between the target pixel and at least some of the surrounding pixels.

8. In a device, a method for transmitting an image, the method comprising:
    transmitting the image that comprises at least one filtered pixel,
    wherein the at least one filtered pixel is provided by applying a bilateral high pass filtering kernel to a target pixel and surrounding pixels corresponding to the target pixel, the bilateral high pass filtering kernel being based on a high pass photometric filtering kernel in which high pass filtering kernel values are determined based on Euclidean distances between the target pixel and at least some of the surrounding pixels.

9. A circuit for filtering at least one pixel of an image, the circuit comprising:
    a distance calculation component operative to receive a target pixel and surrounding pixels corresponding to the target pixel and to determine distances between the target pixel and at least some of the surrounding pixels;
    a first kernel generation component, coupled to the distance calculation component, operative to determine a bilateral high pass filtering kernel based at least in part upon the distances between the target pixel and the surrounding pixels; and
    a filtering component, in communication with the first kernel generation component, operative to receive the target pixel and the surrounding pixels and to apply the bilateral high pass filtering kernel to the target pixel and the surrounding pixels to provide a filtered pixel.

10. The circuit of claim 9, the kernel generation component further comprising:
    a comparison component operative to compare each of the distances with a threshold value and to provide a non-zero high pass filtering kernel value for each distance comparing favorably with the threshold value and to provide a zero high pass filtering kernel value for each distance comparing unfavorably with the threshold value, wherein a high pass photometric filtering kernel is based at least in part upon the non-zero and zero high pass kernel values.

11. The circuit of claim 9, the first kernel generation component being further operative to determine a high pass spatial filtering kernel and to multiply the high pass spatial filtering kernel with a high pass photometric filtering kernel to provide the bilateral high pass filtering kernel.

12. The circuit of claim 9, further comprising:
    a second kernel generation component, coupled to the distance calculation component, operative to determine a bilateral low pass filtering kernel based at least in part upon the distances between the target pixel and the surrounding pixels.

13. The circuit of claim 12, further comprising:
    a combination component, coupled to the first kernel generation component, the second kernel generation component and the filtering component, operative to combine the bilateral high pass filtering kernel and the bilateral low pass filtering kernel to provide a combined bilateral filtering kernel, wherein the filtering component is operative to apply the combined bilateral filtering kernel to the target pixel and the surrounding pixels to provide the filtered pixel.

14. A device capable of filtering an image, the device comprising:
  a storage component operative to store a digital representation of the image, the digital representation further comprising a plurality of pixels; and
  a circuit, in communication with the storage component, operative to receive at least some of the plurality of pixels including a target pixel and surrounding pixels corresponding to the target pixel, the circuit being further operative to determine a bilateral high pass filtering kernel based at least in part upon on a high pass photometric filtering kernel in which high pass filtering kernel values are determined based on Euclidean distances between the target pixel and at least some of the surrounding pixels and to apply the bilateral high pass filtering kernel to the target pixel and surrounding pixels to provide a filtered pixel.

15. The device of claim 14, further comprising:
  a display, in communication with the circuit, operative to display the filtered pixel.

16. The device of claim 14, further comprising:
  an image capture component, in communication with the storage component, operative to obtain the digital representation of the image.

17. The device of claim 14, the circuit being further operative to determine a bilateral low pass filtering kernel based at least in part upon the target pixel and surrounding pixels and to apply the bilateral low pass filtering kernel to the target pixel and the surrounding pixels to provide the filtered pixel.

18. The device of claim 17, the circuit being further operative to combine the bilateral high pass filtering kernel and the bilateral low pass filtering kernel to provide a combined bilateral filtering kernel, the circuit being further operative to operative to apply the combined bilateral filtering kernel to the target pixel and the surrounding pixels to provide the filtered pixel.

19. The device of claim 14, wherein the device comprises a wireless communication device.

\* \* \* \* \*

UNITED STATES PATENT AND TRADEMARK OFFICE
CERTIFICATE OF CORRECTION

PATENT NO. : 7,599,569 B2  
APPLICATION NO. : 11/332001  
DATED : October 6, 2009  
INVENTOR(S) : Smirnov et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 938 days.

Signed and Sealed this

Twenty-eighth Day of September, 2010

David J. Kappos  
*Director of the United States Patent and Trademark Office*